(12) United States Patent
Sakamoto et al.

(10) Patent No.: US 12,177,362 B2
(45) Date of Patent: Dec. 24, 2024

(54) ATTRIBUTE INFORMATION CONVERSION DEVICE, COMPUTER-READABLE RECORDING MEDIUM STORING ATTRIBUTE INFORMATION CONVERSION PROGRAM, AND ATTRIBUTE INFORMATION CONVERSION METHOD

(71) Applicant: Fujitsu Limited, Kawasaki (JP)

(72) Inventors: Takuya Sakamoto, Kawasaki (JP);
Mebae Yamaoka, Kawasaki (JP);
Takeru Fukuoka, Chuo (JP)

(73) Assignee: FUJITSU LIMITED, Kawasaki (JP)

( * ) Notice: Subject to any disclaimer, the term of this patent is extended or adjusted under 35 U.S.C. 154(b) by 223 days.

(21) Appl. No.: 17/968,833

(22) Filed: Oct. 19, 2022

(65) Prior Publication Data

US 2023/0246846 A1    Aug. 3, 2023

(30) Foreign Application Priority Data

Jan. 31, 2022    (JP) .................................. 2022-013081

(51) Int. Cl.
*H04L 9/32*    (2006.01)
(52) U.S. Cl.
CPC .................................. *H04L 9/3247* (2013.01)
(58) Field of Classification Search
CPC .................................................. H04L 9/3247
(Continued)

(56) References Cited

U.S. PATENT DOCUMENTS

| | | | |
|---|---|---|---|
| 2010/0154041 A1* | 6/2010 | Dalzell | H04L 9/3213 726/6 |
| 2017/0223001 A1* | 8/2017 | Haddad | G06Q 30/08 |
| 2020/0092114 A1* | 3/2020 | Androulaki | H04L 63/0823 |

FOREIGN PATENT DOCUMENTS

| | | |
|---|---|---|
| JP | 2003-044607 A | 2/2003 |
| JP | 2010-118069 A | 5/2010 |
| WO | 2004/008282 A2 | 1/2004 |

OTHER PUBLICATIONS

Gruner, Andreas et al., "ATIB: Design and Evaluation of an Architecture for Brokered Self-Sovereign Identity Integration and Trust-Enhancing Attribute Aggregation for Service Provider", IEEE Access, vol. 9, Sep. 28, 2021, pp. 138553-138570, XP011883322.

(Continued)

*Primary Examiner* — Kambiz Zand
*Assistant Examiner* — Phuc Pham
(74) *Attorney, Agent, or Firm* — Fujitsu Intellectual Property Center

(57) ABSTRACT

An attribute information conversion device includes: a memory; and a processor coupled to the memory and configured to: issue first access information and second access information linked to each other in response to a request upon reception of the request for conversion from attribute information of a first type of a user that may be used in a first service into the attribute information of a second type that may be used in a second service different from the first service; perform, upon acquisition of the attribute information of the user from a terminal through the first access information, conversion of the acquired attribute information from the attribute information of the first type into the attribute information of the second type; and output the converted attribute information to a terminal that has made access through the second access information.

7 Claims, 10 Drawing Sheets

(58) Field of Classification Search
USPC .......................................................... 713/176
See application file for complete search history.

(56) References Cited

OTHER PUBLICATIONS

Maram, Deepak et al.,"CanDID: Can-Do Decentralized Identity with Legacy Compatibility, Sybil-Resistance, and Accountability", IACR, International Association for Cryptologic Research, vol. 2020729:190903, Jul. 29, 2020, pp. 1-21, XP061036239, Retrieved from the Internet: URL:http://eprint.iacr.org/2020/934.pdf, [retrieved on Jul. 29, 2020].
Yan, Chih-Ming et al.,"Design and Implementation of WAP Certificate Converter Toolkit", Proceedings of the 7th International Conference on Mobile Data Management (MDM'06), May 10, 2006, pp. 1-8, XP0109180.
Extended European Search Report dated Jun. 7, 2023 for corresponding to European Patent Application No. 22202750.0, 9 pages.

* cited by examiner

ATTRIBUTE INFORMATION CONVERSION DEVICE, COMPUTER-READABLE RECORDING MEDIUM STORING ATTRIBUTE INFORMATION CONVERSION PROGRAM, AND ATTRIBUTE INFORMATION CONVERSION METHOD

CROSS-REFERENCE TO RELATED APPLICATION

This application is based upon and claims the benefit of priority of the prior Japanese Patent Application No. 2022-13081, filed on Jan. 31, 2022, the entire contents of which are incorporated herein by reference.

FIELD

The embodiment discussed herein is related to an attribute information conversion device, an attribute information conversion program, and an attribute information conversion method.

BACKGROUND

In recent years, the concept of self-sovereign identity (SSI), which aims to allow individuals to control their own identities, has been attracting attention to compete with the world in which huge private companies manage a large amount of personal data. Furthermore, in order to achieve the SSI, development of a decentralized identity (DID) platform using distributed public key infrastructure (PKI) has been progressing. The DID platform is a mechanism for personal management of personal attribute information (age, gender, etc.) with a signature of an issuer that secures authenticity of the attribute information. Currently, various companies and organizations are developing the DID platform, and it is expected that there will be a wide variety of management entities (consortiums) for the DID platform itself in the future.

Japanese Laid-open Patent Publication No. 2010-118069, Japanese Laid-open Patent Publication No. 2003-44607, U.S. Patent Application Publication No. 2017/0223001, and U.S. Patent Application Publication No. 2010/0154041 are disclosed as related art.

SUMMARY

According to an aspect of the embodiments, an attribute information conversion device includes: a memory; and a processor coupled to the memory and configured to: issue first access information and second access information linked to each other in response to a request upon reception of the request for conversion from attribute information of a first type of a user that may be used in a first service into the attribute information of a second type that may be used in a second service different from the first service; perform, upon acquisition of the attribute information of the user from a terminal through the first access information, conversion of the acquired attribute information from the attribute information of the first type into the attribute information of the second type; and output the converted attribute information to a terminal that has made access through the second access information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, in the DID platform, a user (holder) receives a certificate containing user attribute information from an issuer. A certificate is plain text character data, and a digital signature (hereinafter simply referred to as a "signature") of the issuer is attached to the certificate. The user may prove his/her own attribute by presenting the certificate with the signature of the issuer to a verifier. For example, when a licensing center (issuer) issues a driver's license (certificate) to a driver (user), the driver is enabled to prove that he/she is 20 years of age or over by presenting the driver's license to a liquor shop (verifier) using the DID platform. Furthermore, for example, when a school (issuer) issues a certificate of graduation to a graduate (user), the graduate is enabled to prove that he/she is a graduate of the school by presenting the certificate of graduation to a company (verifier) using the DID platform.

When there are multiple DID platforms, each of the DID platforms has a different signing/verifying scheme. Accordingly, verification may not be carried out in a case where the DID platform used by the issuer to issue the certificate is different from the DID platform available to the verifier, for example.

In one aspect, the embodiment aims to provide an attribute information conversion device, an attribute information conversion program, and an attribute information conversion method capable of converting user attribute information that may be used in a first service into attribute information that may be used in a second service.

Hereinafter, an embodiment will be described in detail with reference to FIGS. 1 to 10. An information processing system 10 according to the present embodiment is configured in such a manner that two DID platforms (first DID platform 100 and second DID platform 200) having different signature schemes and verification schemes may be interconnected. For example, the first DID platform 100 corresponds to a first service that may use user attribute information of a first type, and the second DID platform 200 corresponds to a second service that may use user attribute information of a second type. In the first DID platform 100 and the second DID platform 200, a person him/herself is enabled to manage personal attribute information.

Figure 1:
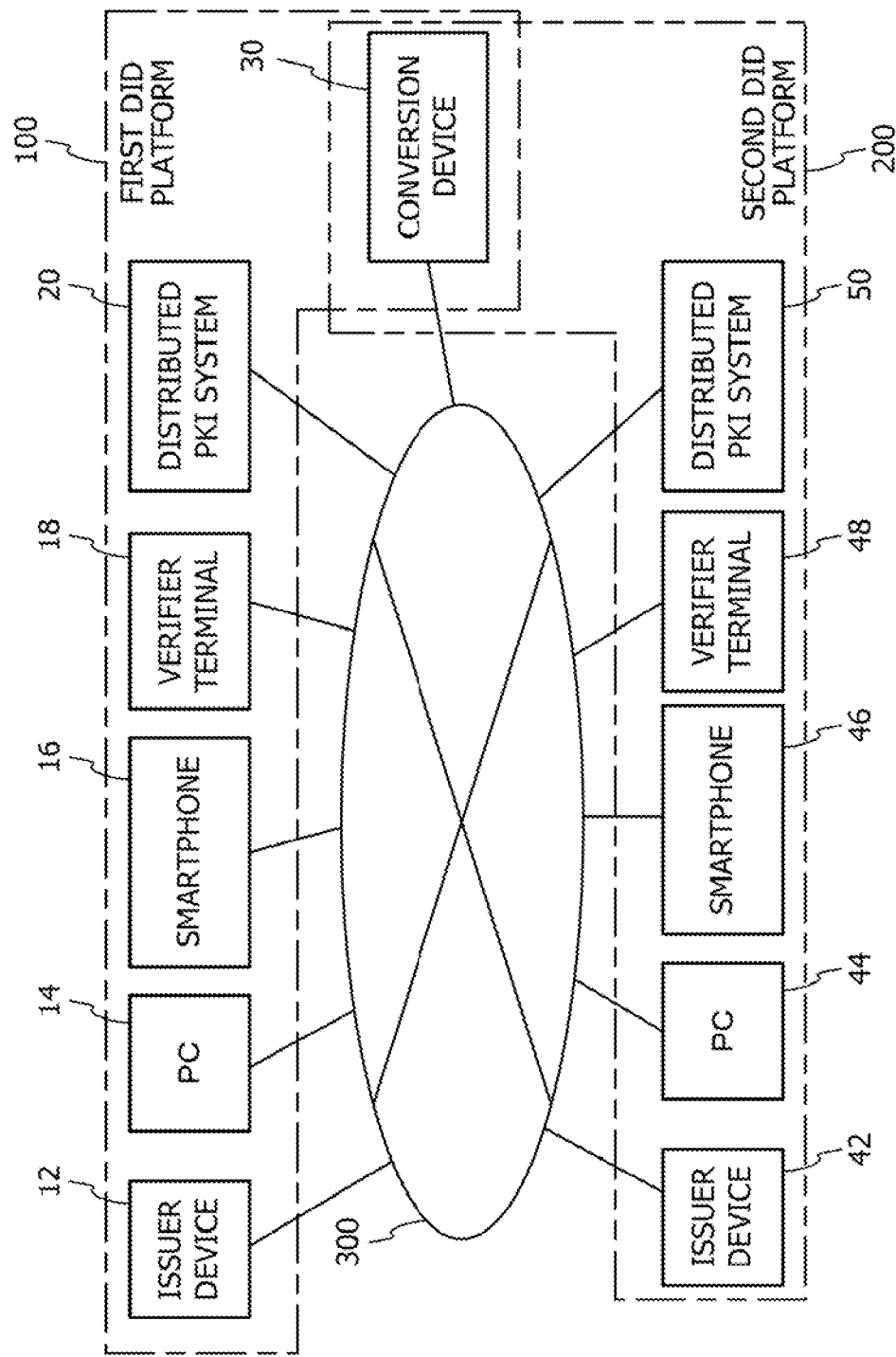
FIG. 1 is a diagram schematically illustrating a configuration of an information processing system according to an embodiment.

FIG. 1 is a diagram schematically illustrating a configuration of the information processing system 10. As illustrated in FIG. 1, the information processing system 10 includes a network 300, and devices belonging to the respective first DID platform 100 and second DID platform 200 are connected to the network 300.

An issuer device 12, a personal computer (PC) 14 to be used by the user, a smartphone 16 as a terminal to be used by the user, a verifier terminal 18, a distributed PKI system 20, and a conversion device 30 as an attribute information conversion device belong to the first DID platform 100. Furthermore, an issuer device 42, a PC 44, a smartphone 46, a verifier terminal 48, a distributed PKI system 50, and the conversion device 30 belong to the second DID platform 200.

The issuer devices 12 and 42 are one or more computers managed by an issuer that issues a certificate. For example, in a case where the issuer using the issuer devices 12 and 42 is a university, the issuer devices 12 and 42 issue certificates of graduation to university graduates.

The PCs 14 and 44 are computers used by the user who proves his/her own attribute using the certificate. The smartphones 16 and 46 are terminals used by the user at the time of receiving the issued certificate or using the certificate.

The verifier terminals 18 and 48 are computers managed by a verifier that verifies the attribute of the user on the basis of the certificate presented by the user via the smartphones 16 and 46.

The distributed PKI systems 20 and 50 are one or more computers that manage public keys. The distributed PKI systems 20 and 50 may manage the public keys in a distributed ledger such as a blockchain.

The conversion device 30 is a computer managed by an intermediary operator that provides a service of converting a certificate that may be used in the first DID platform 100 (or second DID platform 200) into a certificate that may be used in the second DID platform 200 (or first DID platform 100). As illustrated in FIG. 1, the conversion device 30 belongs to both of the first DID platform 100 and the second DID platform 200.

Figure 2:
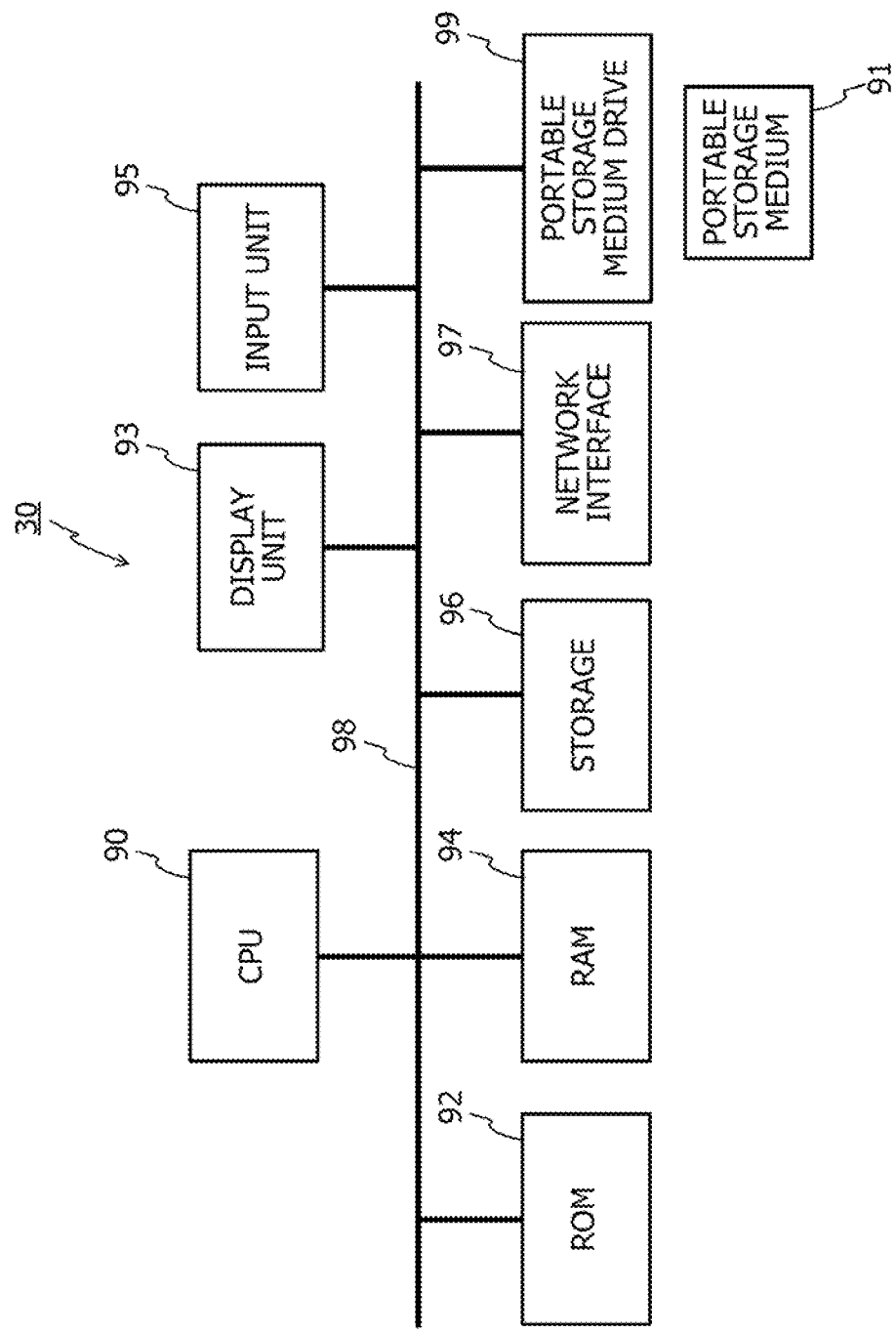
FIG. 2 is a diagram illustrating an exemplary hardware configuration of a conversion device.

FIG. 2 is a diagram illustrating an exemplary hardware configuration of the conversion device 30. As illustrated in FIG. 2, the conversion device 30 includes a central processing unit (CPU) 90, a read only memory (ROM) 92, a random access memory (RAM) 94, a storage (hard disk drive (HDD) or solid state drive (SSD)) 96, a network interface 97, a portable storage medium drive 99, a display unit 93, an input unit 95, and the like. Each of those components of the conversion device 30 is connected to a bus 98. The display unit 93 includes a liquid crystal display, an organic electroluminescent (EL) display, and the like, and the input unit 95 includes a mouse, a keyboard, a touch panel, and the like. In the conversion device 30, the CPU 90 executes a program (including attribute information conversion program) stored in the ROM 92 or the storage 96 or a program read by the portable storage medium drive 99 from a portable storage medium 91, thereby implementing a function of each unit illustrated in FIG. 6. Note that the function of each unit in FIG. 6 may be implemented by, for example, an integrated circuit such as an application specific integrated circuit (ASIC), a field programmable gate array (FPGA), or the like. Note that other devices (issuer devices 12 and 42, PCs 14 and 44, smartphones 16 and 46, verifier terminals 18 and 48, and distributed PKI systems 20 and 50) in FIG. 1 may also be implemented by hardware similar to that of the conversion device 30.

Here, a method by which the user proves his/her own attribute information to the verifier within the same DID platform when there are two DID platforms as illustrated in FIG. 1 will be described with reference to FIG. 3.

Figure 3:
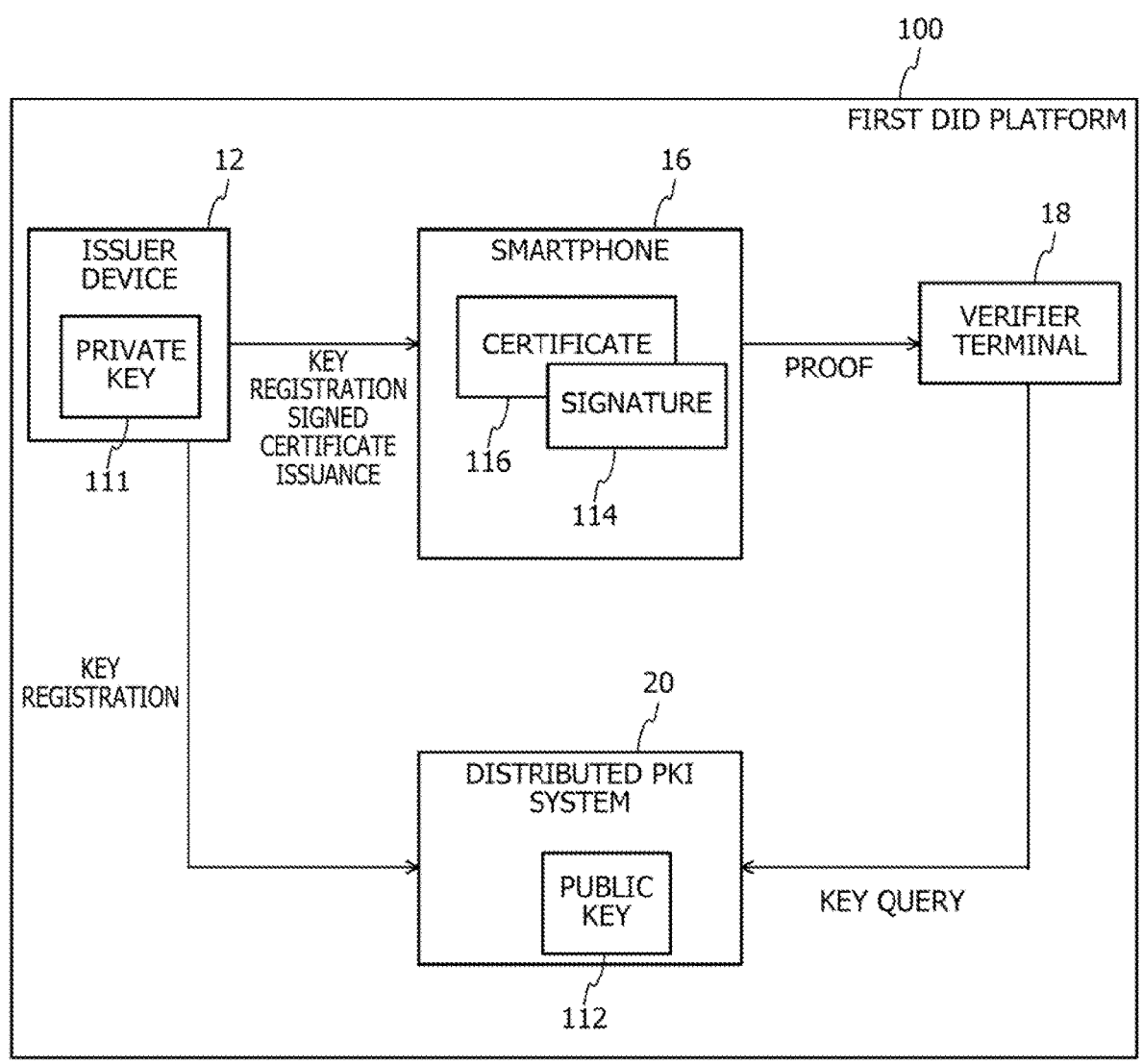
FIG. 3 is a diagram illustrating an exemplary procedure for proving attribute information within the same DID platform.

FIG. 3 is a diagram illustrating an exemplary procedure for proving the attribute information within the same DID platform. In the example of FIG. 3, it is assumed that the user belonging to the first DID platform 100 proves validity of the attribute information indicating his/her own attribute to the verifier belonging to the same first DID platform 100.

The issuer device 12 generates a pair of a private key 111 and a public key 112 of the issuer. The issuer device 12 registers the public key 112 in the distributed PKI system 20 so that another device belonging to the first DID platform 100 may use the public key 112.

The issuer device 12 issues a certificate 116 (also called a "credential") with a signature 114 in response to a request from the user, for example. The certificate 116 contains personal information of the user. For example, in a case where the certificate 116 is a certificate of graduation, the certificate 116 contains a name of the user, student ID number, year of graduation, university name, department name, and the like. The signature 114 is an electronic signature generated using the private key 111 of the issuer in accordance with specifications of the first DID platform 100.

The user receives the certificate 116 with the signature 114 issued by the issuer device 12 on the smartphone 16. The smartphone 16 saves the certificate 116 with the signature 114 in storage. When the user proves the personal attribute information to the verifier, the certificate 116 with the signature 114 is transmitted from the smartphone 16 to the verifier terminal 18.

The verifier terminal 18 queries the distributed PKI system 20 for the public key 112 of the issuer. The distributed PKI system 20 transmits the corresponding public key 112 to the verifier terminal 18. The verifier terminal 18 verifies the signature 114 using the public key 112, and confirms that the contents of the certificate 116 are certified by the issuer device 12. This allows the user to prove his/her own attribute to the verifier.

Note that, in the second DID platform 200 as well, the user may prove his/her own attribute to the verifier by a similar process.

Figure 4:
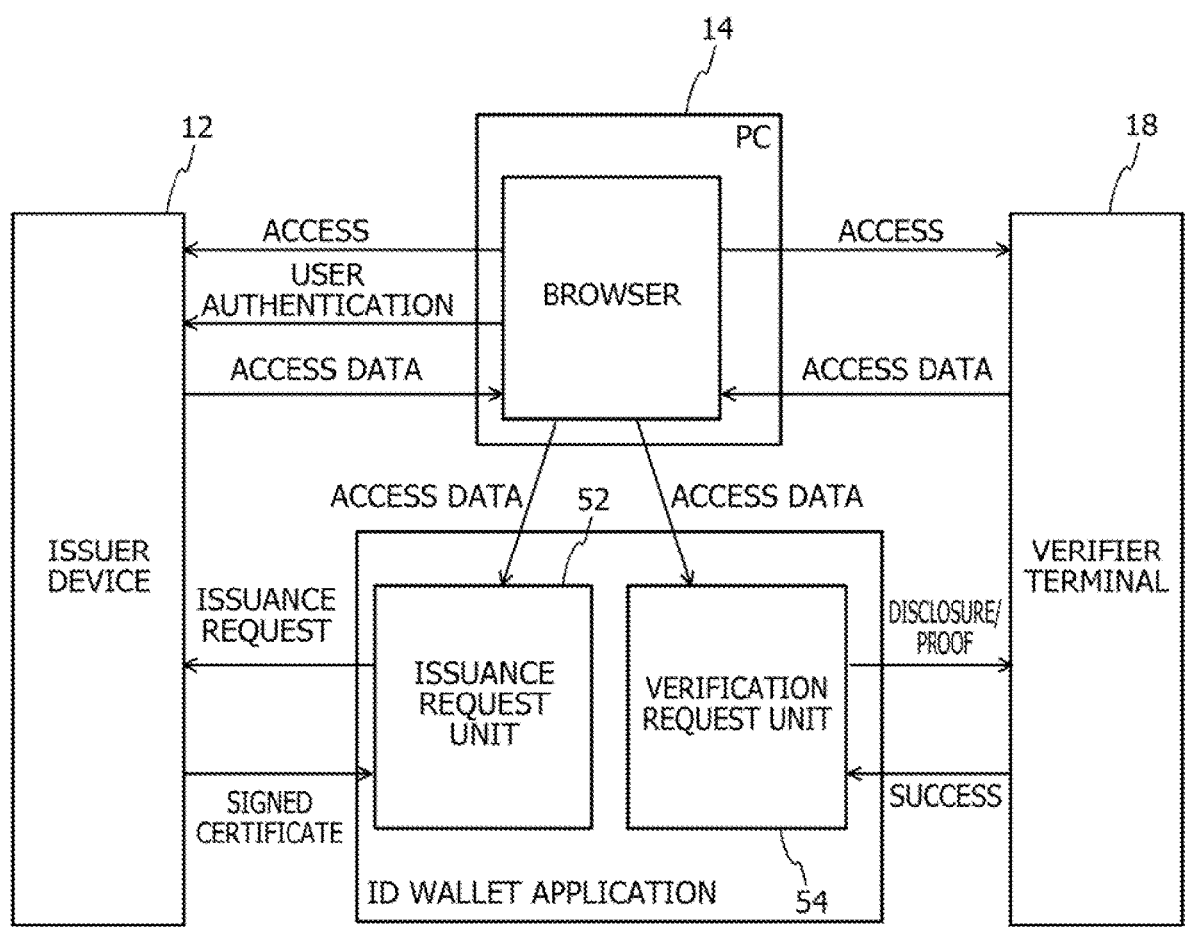
FIG. 4 is a diagram illustrating functions of an Identity Wallet application that operates in a smartphone in FIG. 3.

FIG. 4 illustrates functions of an Identity Wallet application (hereinafter referred to as an "ID Wallet application") that operates in the smartphone 16 in FIG. 3. The ID Wallet application has functions of an issuance request unit 52 and a verification request unit 54.

The issuance request unit 52 has a function of requesting the issuer device 12 to issue a signed certificate. Furthermore, the issuance request unit 52 has a function of obtaining a signed certificate issued by the issuer device 12. Note that the user accesses the issuer device 12 in the browser of the PC 14, for example, and receives, from the issuer device 12, access data including the uniform resource locator (URL) of the issuer device 12 after user authentication. Then, the user accesses the issuer device 12 from the ID Wallet application (issuance request unit 52) using the received access data, thereby requesting issuance of the signed certificate.

The verification request unit 54 has a function of disclosing the signed certificate to the verifier terminal 18 and proving the user attribute to the verifier. Furthermore, the verification request unit 54 has a function of obtaining information indicating verification success from the verifier terminal 18 when the verification has succeeded in the verifier terminal 18. Note that the user accesses the verifier terminal 18 in the browser of the PC 14, for example, and receives access data including the URL of the verifier terminal 18. Then, the user accesses the verifier terminal 18 from the ID Wallet application (verification request unit 54) using the received access data, thereby disclosing the signed certificate.

As described with reference to FIG. 3, the user belonging to the first DID platform 100 may prove the validity of the attribute information indicating his/her own attribute to the verifier belonging to the same first DID platform 100. However, even when the user presents the certificate 116 with the signature 114 issued by the issuer device 12 of the first DID platform 100 to the verifier terminal 48 of the second DID platform 200, the validity of the user attribute information may not be proved to the verifier. This is because the certificate 116 is created according to the format of the first DID platform 100, and the signature 114 is generated according to the specifications of the first DID platform 100 using the private key 111 of the issuer. In view of the above, in the present embodiment, the conversion device 30, which converts the signed certificate issued in one DID platform such that it may be used for verification in another DID platform, is provided in a form belonging to both of the first DID platform 100 and the second DID platform 200.

Figure 5:
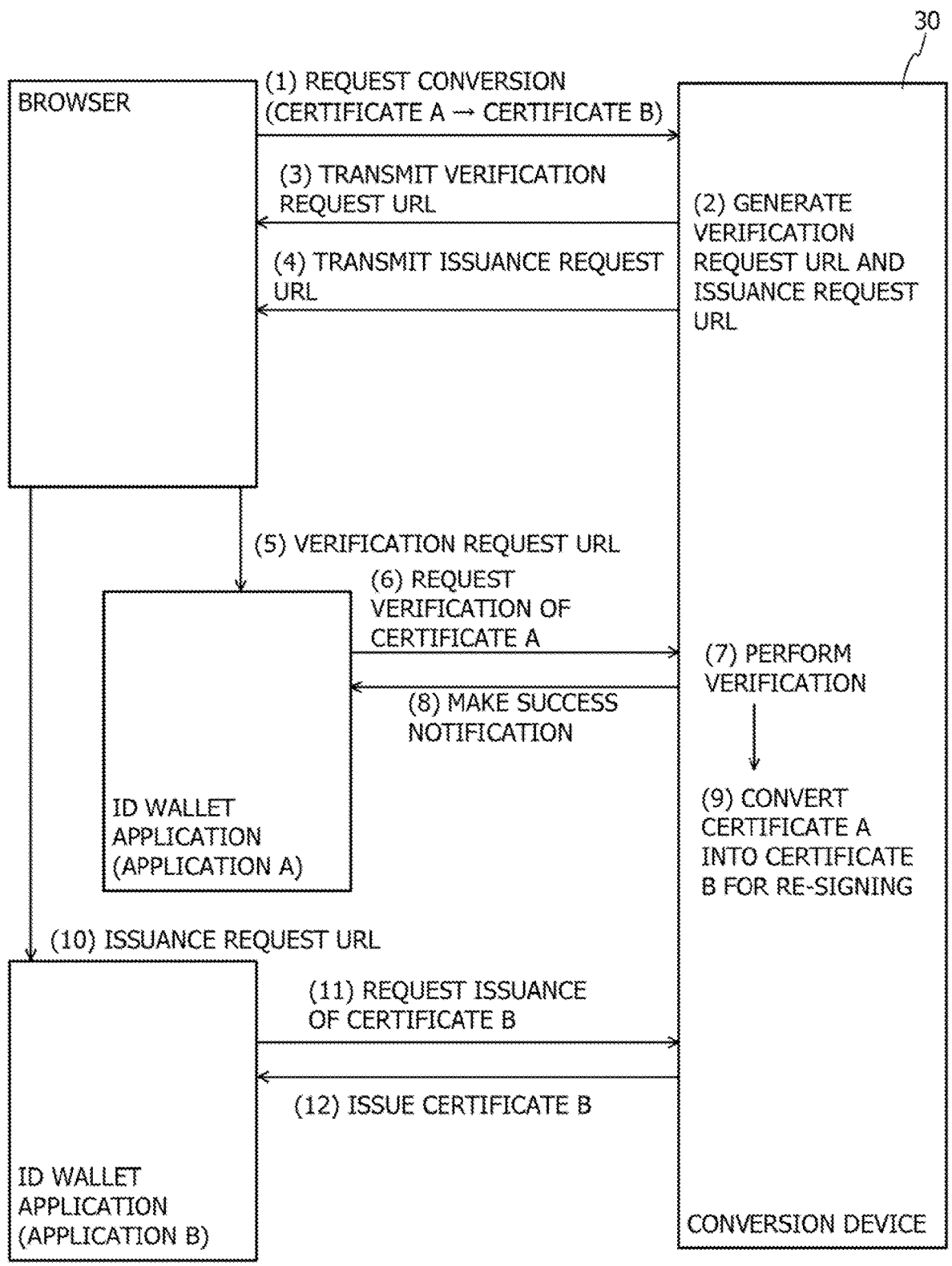
FIG. 5 is a diagram schematically illustrating a flow of a process for converting a signed certificate using the conversion device.

FIG. 5 schematically illustrates a flow of a process for converting a signed certificate using the conversion device 30. Note that, in FIG. 5, it is assumed that a signed certificate (credential) before conversion is called a "certificate A" and a signed certificate (credential) after conversion is called a "certificate B" for convenience of explanation. Furthermore, it is assumed that an ID Wallet application that may use the certificate A, which is installed in the smartphones 16 and 46, is called an "application A" and an ID Wallet application that may use the certificate B is called an "application B". The application A may transmit/receive the certificate A according to a DID platform protocol capable of using the certificate A, and the application B may transmit/receive the certificate B according to a DID platform protocol capable of using the certificate B.

When the user wants to convert the certificate A into the certificate B to use it, the user transmits a conversion request from the browser of the PC to the conversion device 30 (see (1) in FIG. 5). Upon reception of this conversion request, the conversion device 30 generates identification information (conversion ID) corresponding to the conversion request. Furthermore, the conversion device 30 generates a verification request URL (first access information) containing the generated conversion ID and an issuance request URL (second access information) containing the conversion ID (see (2) in FIG. 5). Then, the conversion device 30 transmits the generated verification request URL and issuance request URL to the browser (see (3) and (4) in FIG. 5).

Next, the user obtains the verification request URL from the browser using the application A (see (5) in FIG. 5), and accesses the verification request URL, thereby requesting the conversion device 30 to verify the certificate A (see (6) in FIG. 5).

The conversion device 30 verifies the validity of the certificate A (see (7) in FIG. 5), and if the verification has succeeded, it notifies the application A of that fact (see (8) in FIG. 5). Furthermore, the conversion device 30 converts the successfully verified certificate A into the certificate B, and re-signs it. Examples of a certificate format include a JSON Web Token (JWT) format and a JSON-LD format. Furthermore, examples of the signature scheme include a common digital signature scheme such as the Elliptic Curve Digital Signature Algorithm (ECDSA) and a signature scheme that makes it possible to disclose a partially concealed certificate such as the Camenisch-Lysyanskaya (CL) signature scheme. The conversion device 30 executes the process according to the certificate format and the signature scheme that may be used in each DID platform.

Next, the user obtains the issuance request URL from the browser using the application B (see (10) in FIG. 5), and accesses the issuance request URL, thereby requesting the conversion device 30 to issue the certificate B (see (11) in FIG. 5).

The conversion device 30 issues the certificate B in response to the request from the application B, and transmits it to the application B (see (12) in FIG. 5). As a result, it becomes possible to convert the certificate A that may be used in the DID platform supporting the application A into the certificate B that may be used in the DID platform supporting the application B.

Figure 6:
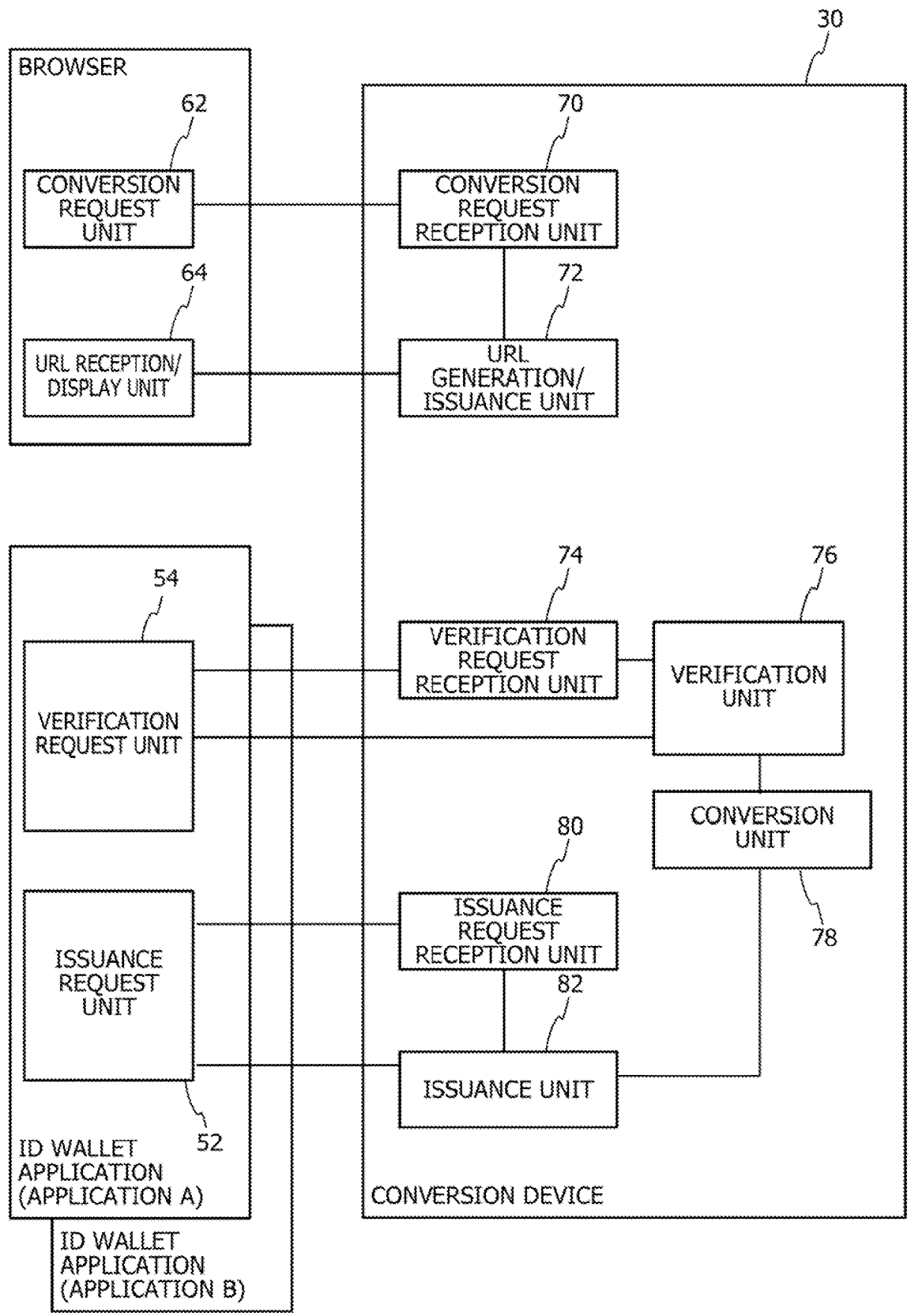
FIG. 6 is a functional block diagram illustrating functions of the conversion device.

FIG. 6 is a functional block diagram illustrating functions of the conversion device 30. Note that FIG. 6 also illustrates functions of the browsers of the PCs 14 and 44, and functions of the ID Wallet application that operates on the smartphones 16 and 46.

As illustrated in FIG. 6, the conversion device 30 have functions of a conversion request reception unit 70, a URL generation/issuance unit 72 as an access information issuance unit, a verification request reception unit 74, a verification unit 76, a conversion unit 78, an issuance request reception unit 80, and an issuance unit 82.

The conversion request reception unit 70 receives a conversion request for a signed certificate (e.g., conversion request from the certificate A to the certificate B) from a conversion request unit 62 of the browser.

When the conversion request reception unit 70 receives the conversion request from the certificate A to the certificate B, the URL generation/issuance unit 72 generates conversion ID corresponding to the conversion request. Furthermore, the URL generation/issuance unit 72 generates a verification request URL including the generated conversion ID and an issuance request URL including the generated conversion ID, and transmits (issues) them to the browser. As an example, when the URL generation/issuance unit 72 generates "0001" as the conversion ID, it generates "XXX.com/verify0001" as the verification request URL, and generates "XXX.com/issue0001" as the issuance request URL. Furthermore, when the URL generation/issuance unit 72 generates "0002" as the conversion ID, it generates "XXX.com/verify0002" as the verification request URL, and generates "XXX.com/issue0002" as the issuance request URL. Since the verification request URL and the issuance request URL generated for each conversion request in this manner contain the same conversion ID, it can be said that they are linked to each other. The URL generation/issuance unit 72 activates the verification unit 76 and the conversion unit 78 at the generated verification request URL, and activates the issuance unit 82 at the generated issuance request URL. For example, services of the verification unit 76 and the conversion unit 78 are provided at the generated verification request URL, and services of the issuance unit 82 are provided at the generated issuance request URL.

Note that, when a URL reception/display unit 64 of the browser receives the verification request URL, it generates a two-dimensional code in which information of the verification request URL is embedded, and displays it on the browser. The user captures an image of the two-dimensional code using a camera while the application A is running on the smartphone 16. As a result, the verification request unit 54 of the application A is enabled to access the verification request URL. Furthermore, when the URL reception/display unit 64 receives the issuance request URL, it generates a two-dimensional code in which information of the issuance request URL is embedded, and displays it on the browser. The user captures an image of the two-dimensional code using the camera while the application B is running on the smartphone 16. As a result, the issuance request unit 52 of the application B is enabled to access the issuance request URL.

When the verification request unit 54 of the application A transmits the certificate A through the verification request URL, the verification request reception unit 74 obtains the certificate A, and transfers it to the verification unit 76 activated at the verification request URL.

For example, the verification unit 76 obtains the public key of the issuer from the distributed PKI system belonging to the DID platform in which the obtained certificate A may be used, and carries out verification using the obtained public key. The verification unit 76 notifies the verification request unit 54 of a verification result.

In a case where the verification unit 76 has succeeded in the verification, the conversion unit 78 converts the format of the certificate A into the format of the certificate B, and carries out re-signing using a new private key. Note that the public key paired with the private key used for the re-signing is registered in the distributed PKI system belonging to the DID platform in which the certificate B may be used. Note that the conversion unit 78 transmits the converted certificate B to the issuance unit 82 activated (providing the service) at the issuance request URL containing the same conversion ID.

When the issuance request unit 52 of the application B transmits an issuance request for the certificate B through the issuance request URL, the issuance request reception unit 80 notifies the issuance unit 82 of that fact.

The issuance unit 82 obtains the certificate B corresponding to the issuance request URL, and transmits the certificate B to the issuance request unit 52 of the application B that has accessed the issuance request URL.

Note that the verification request reception unit 74, the verification unit 76, the conversion unit 78, the issuance request reception unit 80, and the issuance unit 82 described above implement functions as a conversion processing unit that converts a signed certificate in response to access from a terminal and outputs it.

Here, the functions of the applications A and B in FIG. 6 are similar to the functions of the ID Wallet application in FIG. 4. For example, according to the present embodiment, no new function needs to be added to the applications A and B while the conversion device 30 is provided in the information processing system 10.

(Processing of Conversion Device 30)

Next, processing of the conversion device 30 will be described in detail according to a flowchart of FIG. 7 with reference to other drawings as appropriate.

Figure 7:
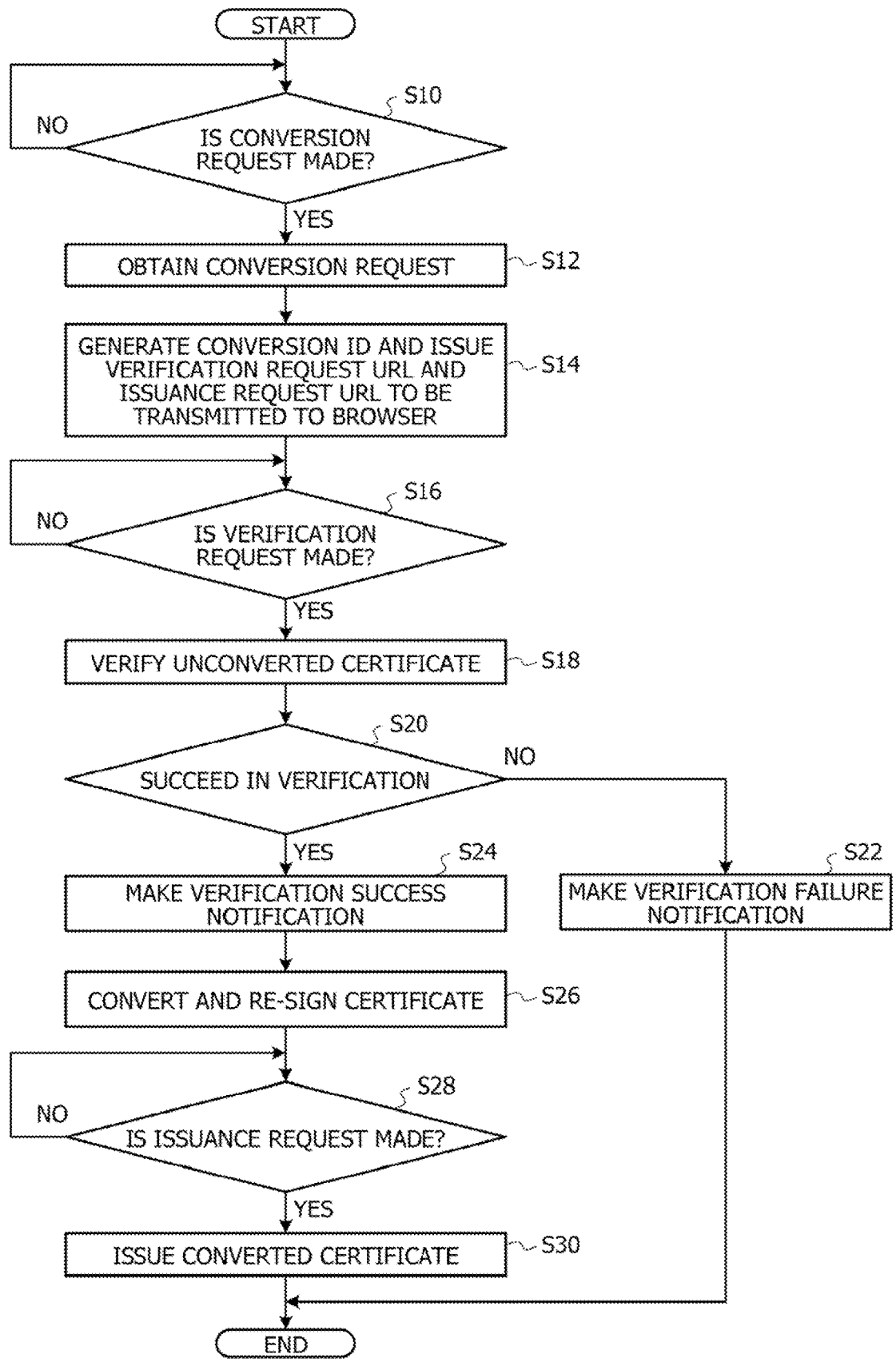
FIG. 7 is a flowchart illustrating a process performed by the conversion device.
Figure 8A:
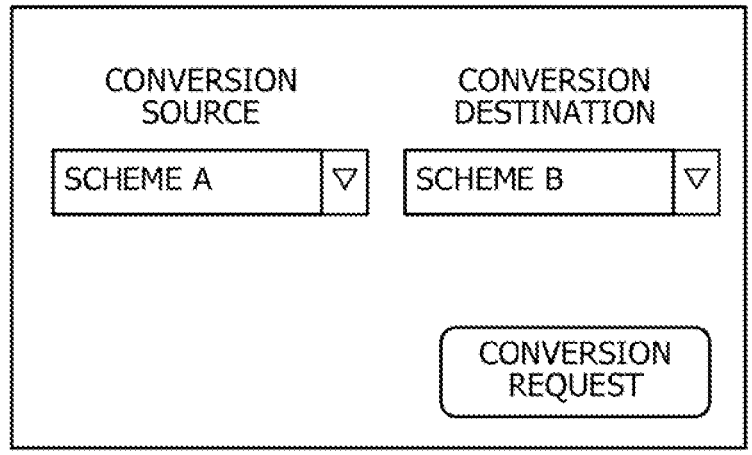
FIGS. 8A to 8C are diagrams illustrating exemplary screens displayed on a browser.

When the process of FIG. 7 starts, first, the conversion request reception unit 70 stands by until a conversion request is input from the browser in step S10. Here, the user displays a screen as illustrated in FIG. 8A on the PC browser, selects a conversion source and a conversion destination, and presses a "conversion request" button, thereby requesting conversion. When the user presses the "conversion request" button on the screen of FIG. 8A, the conversion request unit 62 of the browser transmits a conversion request to the conversion device 30. Upon reception of the conversion request, the conversion request reception unit 70 proceeds to step S12 to obtain the conversion request. Note that, in FIG. 8A, it is assumed that a "scheme A" indicates a scheme operated in the DID platform in which the certificate A may be used and a "scheme B" indicates a scheme operated in the DID platform in which the certificate B may be used.

Figure 8B:
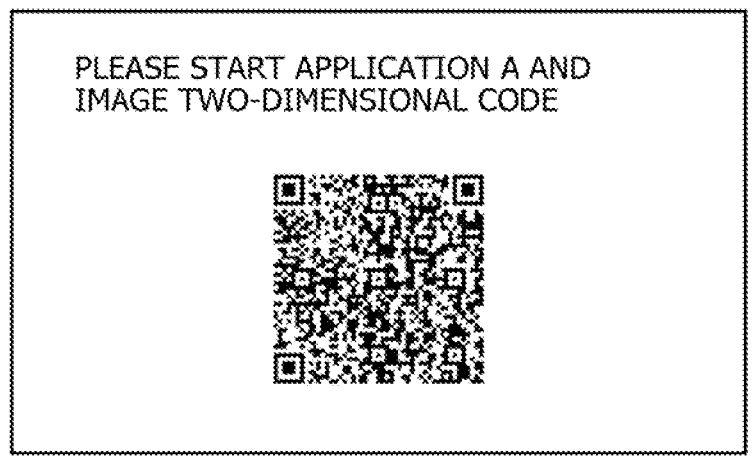

Next, in step S14, the URL generation/issuance unit 72 generates conversion ID (e.g., "0001"). Furthermore, the URL generation/issuance unit 72 issues a verification request URL (e.g., "XXX.com/verify0001") containing the conversion ID and an issuance request URL (e.g., "XXX.com/issue0001") containing the conversion ID, and transmits them to the browser. At this time, the browser generates and displays a screen for displaying a two-dimensional code in which information of the verification request URL (e.g., "XXX.com/verify0001") is embedded as illustrated in FIG. 8B. The user starts the application (application A) supporting the DID platform in which the certificate A before conversion may be used according to the contents displayed on the screen of FIG. 8B, and captures an image of the two-dimensional code. As a result, the application A is enabled to access the verification request URL (e.g., "XXX.com/verify0001").

When the user accesses the verification request URL from the application A, the application A transmits the certificate (certificate A) before conversion to the conversion device 30 to request verification. After step S14 in FIG. 7, since the verification request reception unit 74 stands by until the verification request is received, if the verification request is received from the application A in step S16, the process proceeds to step S18.

When the process proceeds to step S18, the verification request reception unit 74 notifies the verification unit 76 activated at the verification request URL of the received certificate (certificate A) before conversion. Then, the verification unit 76 verifies the certificate before conversion. In this verification, the public key managed in the distributed PKI system belonging to the DID platform in which the certificate A is issued is used to carry out the verification.

In the next step S20, it is determined whether or not the verification unit 76 has succeeded in the verification. If the determination in step S20 is negative, the process proceeds to step S22 so that the verification unit 76 notifies the application A of the fact that the verification has failed, and the entire process of FIG. 7 is terminated.

On the other hand, if the determination in step S20 is affirmative, the process proceeds to step S24, and the verification unit 76 notifies the application A of the fact that the verification has succeeded. Next, in step S26, the conversion unit 78 converts the format of the certificate, and carries out re-signing. The conversion unit 78 registers the public key corresponding to the private key used for the re-signing in the distributed PKI system belonging to the DID platform in which the converted certificate may be used. Furthermore, the conversion unit 78 transfers the converted certificate to the issuance unit 82 activated (providing the service) at the issuance request URL corresponding to the verification request URL accessed by the application A at the time of the verification request.

Figure 8C:
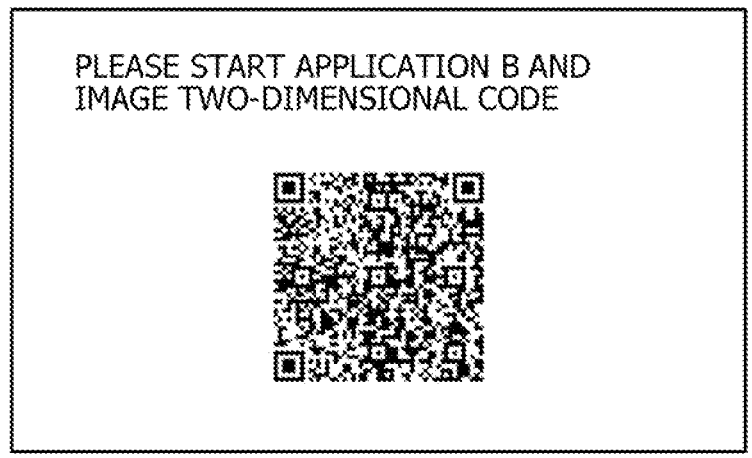

Next, in step S28, the issuance request reception unit 80 stands by until an issuance request is received. Here, the browser generates and displays a screen for displaying a two-dimensional code in which information of the issuance request URL (e.g., "XXX.com/issue0001") is embedded as illustrated in FIG. 8C. The user starts the application (application B) supporting the DID platform in which the converted certificate may be used according to the contents displayed on the screen of FIG. 8C, and captures an image of the two-dimensional code. As a result, the application B is enabled to access the issuance request URL. When the application B accesses the issuance request URL, the process proceeds to step S30, and the issuance unit 82 issues (transmits) the converted certificate to the application B.

Figure 9:
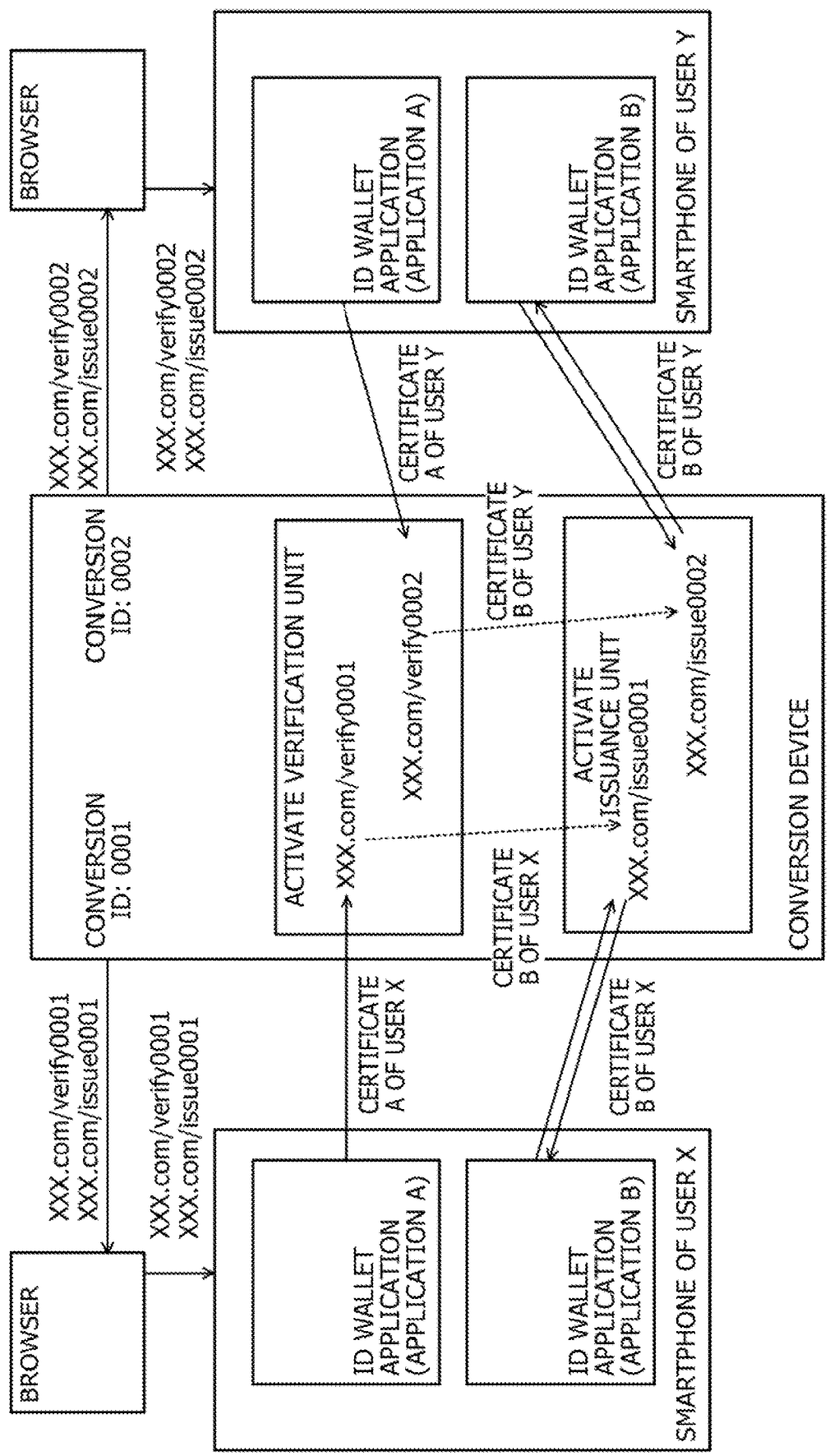
FIG. 9 is a diagram schematically illustrating a case where two users (users X and Y) use the conversion device.

FIG. 9 is a diagram schematically illustrating a case where two users (users X and Y) use the conversion device 30. The conversion device 30 generates different conversion ID for each conversion request. For example, when the user X and the user Y make conversion requests, different conversion IDs (=0001 and 0002) are generated. Furthermore, the verification request URL and the issuance request URL, which are generated for each conversion request, contain the conversion ID, and are linked to each other. As a result, when the user X makes a verification request for the certificate A to the conversion device 30 using the notified verification request URL and makes an issuance request for the certificate B using the notified issuance request URL, the certificate B of the user X him/herself may be obtained. Furthermore, when the user Y makes a verification request for the certificate A to the conversion device 30 using the notified verification request URL and makes an issuance request for the certificate B using the notified issuance request URL, the certificate B of the user Y him/herself may be obtained. Here, since the URLs notified to the user X and to the user Y are different, the user Y never obtains the certificate B of the user X.

Figure 10:
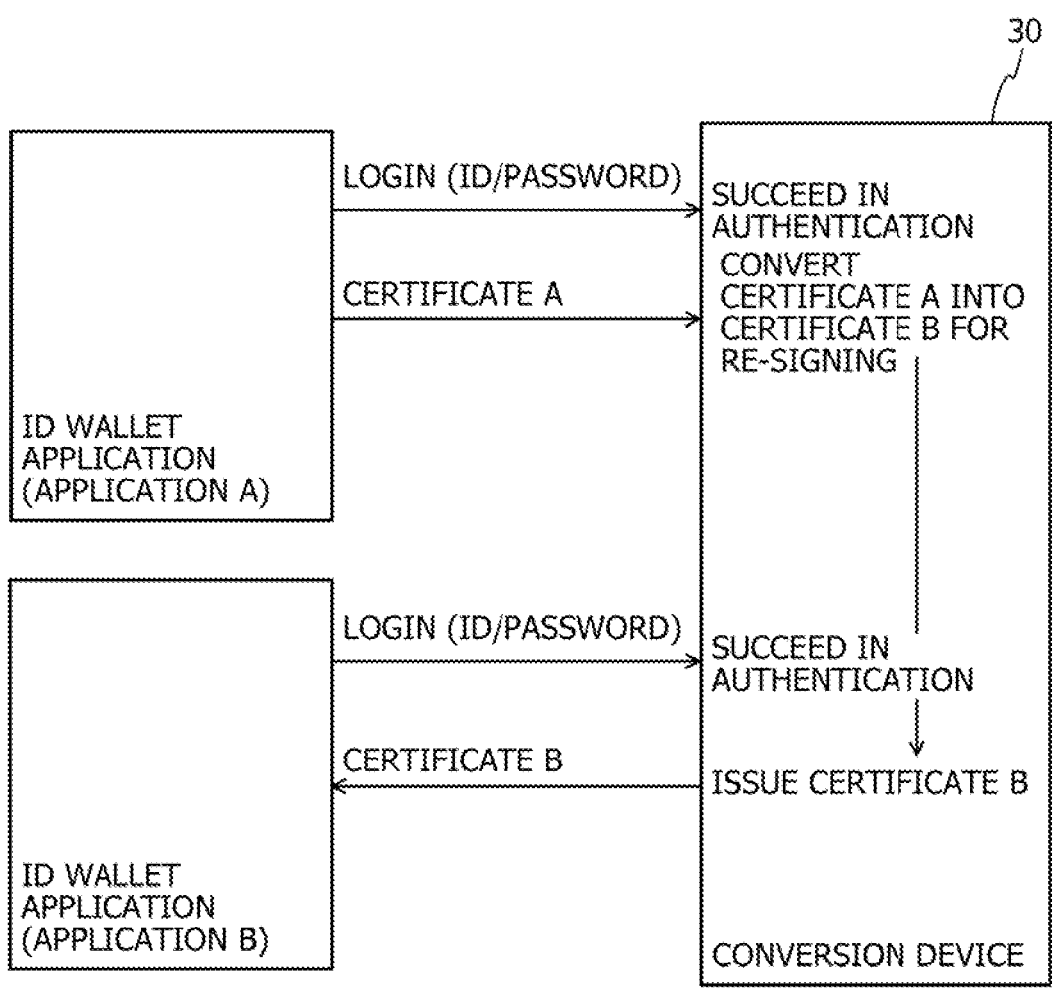
FIG. 10 is a diagram illustrating a comparative example.

FIG. 10 is a diagram for explaining a comparative example. The example of FIG. 10 is common to the present embodiment in that the application A transmits the certificate A to the conversion device 30 and the application B obtains the certificate B converted by the conversion device 30. However, in the example of FIG. 10, both of the applications A and B need to log in to the conversion device 30 using user ID, a password, and the like. This is because it needs to confirm whether the user who has made the conversion request using the application A is identical to the user who has made the issuance request using the application B and whether the user is a valid user. In the case of implementing the example of FIG. 10, an authentication function needs to be added to the applications A and B in FIG. 4. Furthermore, the conversion device 30 needs to manage user IDs, passwords, and the like. Moreover, the user needs to manage the user ID and the password for accessing the conversion device 30. On the other hand, according to the present embodiment, no new function needs to be added to the applications A and B in FIG. 4. Furthermore, the user does not need to manage the user ID and the password for accessing the conversion device 30.

As described in detail above, according to the present embodiment, the conversion request reception unit 70 receives a request (conversion request) for converting a signed certificate of a user that may be used in one DID platform into a signed certificate that may be used in another DID platform. The URL generation/issuance unit 72 issues a verification request URL and an issuance request URL linked to each other in response to the conversion request. When the verification unit 76 obtains the signed certificate transmitted from the smartphone 16 through the verification request URL, it verifies the signature. The conversion unit 78 converts the signed certificate when the verification has succeeded. Then, the issuance unit 82 transmits the converted signed certificate to the smartphone 16 that has made access through the issuance request URL. In this manner, according to the present embodiment, it becomes possible to convert a signed certificate of a user that may be used in one DID platform into a signed certificate that may be used in another DID platform. Furthermore, since the verification request URL and the issuance request URL linked to each other are issued in response to the conversion request, even in a case where there are multiple users, it is possible to issue a converted signed certificate to an appropriate user. Furthermore, the present embodiment has an advantage that no new function (e.g., user authentication function) needs to be added to the existing ID Wallet application (FIG. 4).

Furthermore, according to the present embodiment, the URL generation/issuance unit 72 issues conversion ID for each conversion request, and issues a verification request URL containing the conversion ID and an issuance request URL containing the conversion ID. As a result, it becomes possible to link the verification request URL and the issuance request URL corresponding to the conversion request without managing the verification request URL and the issuance request URL in a linked state using a table or the like in the conversion device 30. However, in the present embodiment, it is also possible to manage the verification request URL and the issuance request URL in the linked state using a table or the like in the conversion device 30. In this case, there is no need to generate the conversion ID, and the verification request URL and the issuance request URL may be generated randomly.

Note that, although the case where the user uses both the PC and the smartphone has been described in the embodiment above, it is not limited to this. For example, both of the browser and the ID Wallet application may run on the PC, or both of the browser and the ID Wallet application may run on the smartphone. In this case, there is no need to use a two-dimensional code to transfer the verification request URL and the issuance request URL from the browser to the ID Wallet application.

Note that, although the case where the ID Wallet application (application A) and the ID Wallet application (application B) in FIG. 6 are installed in the same smartphone has been described in the embodiment above, it is not limited to this. For example, the application A and the application B may be installed in different smartphones.

Note that, although the case where the conversion device 30 transmits the verification request URL and the issuance request URL to the browser at substantially the same timing as in (3) and (4) in FIG. 5 has been described in the embodiment above, it is not limited to this. For example, the conversion device 30 may transmit the issuance request URL to the browser after the conversion and re-signing of the certificate of (9).

Note that the processing functions described above may be implemented by a computer. In that case, a program in which processing content to be implemented by a processing device is described is provided. The program is executed on the computer, whereby the processing functions described above are implemented on the computer. The program in which the processing content is described may be recorded in a computer-readable storage medium (note that a carrier wave is excluded).

In a case of distributing the program, for example, the program is sold in a form of a portable storage medium such as a digital versatile disc (DVD), a compact disc read only memory (CD-ROM), or the like in which the program is recorded. Furthermore, it is also possible to store the program in a storage device of a server computer and transfer the program from the server computer to another computer via a network.

The computer that executes the program stores, for example, the program recorded in the portable storage medium or the program transferred from the server computer in a storage device of its own. Then, the computer reads the program from the storage device of its own, and executes processing according to the program. Note that the computer may also read the program directly from the portable storage medium and execute the processing according to the program. Furthermore, the computer may also sequentially execute the processing according to the received program each time the program is transferred from the server computer.

The embodiment described above is an example of a preferred embodiment. However, the embodiment is not limited to this, and various modifications may be made without departing from the scope of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An attribute information conversion device comprising:
   a memory; and
   a processor coupled to the memory and configured to:
   in a case where a user utilizes second attribute information which is obtained by conversion of first attribute information that is used in a first application and is used in a second application different from the first application, issue verification request access information and issuance request access information linked to each other in response to reception of a request for conversion from the first attribute information into the second attribute information;
   perform, upon acquisition of the first attribute information of the user from a terminal through the verification request access information, conversion of the acquired first attribute information into the second attribute information; and
   output the second attribute information to the terminal through the issuance request access information.

2. The attribute information conversion device according to claim 1, wherein the processor issues identification information for each of the request and includes the identification information in the verification request access information and the issuance request access information so that the verification request access information and the issuance request access information are linked.

3. The attribute information conversion device according to claim 1, wherein upon the acquisition of the first attribute information of the user, the processor performs verification on signature information included in the acquired first attribute information, and converts the first attribute information into the second attribute information to perform re-signing when the verification is successful.

4. A non-transitory computer-readable recording medium storing an attribute information conversion program causing a computer to execute a processing of:
   in a case where a user utilizes second attribute information which is obtained by conversion of first attribute information that is used in a first application and is used in a second application different from the first application, issuing verification request access information and issuance request access information linked to each other in response to reception of a request for conversion from the first attribute information into the second attribute information;
   performing, upon acquisition of the first attribute information of the user from a first terminal through the verification request access information, conversion of the acquired first attribute information into the second attribute information; and
   outputting the second attribute information to the terminal through the issuance request access information.

5. The non-transitory computer-readable recording medium according to claim 4, further comprising:
   issuing identification information for each of the request; and
   linking the verification request access information and the issuance request access information are linked with each other by including the identification information in the verification request access information and the issuance request access information.

6. The non-transitory computer-readable recording medium according to claim 4, further comprising:
   upon the acquisition of the first attribute information of the user, performing verification on signature information included in the acquired first attribute information; and
   converting the first attribute information into the second attribute information to perform re-signing when the verification is successful.

7. An attribute information conversion method comprising:
   in a case where a user utilizes second attribute information which is obtained by conversion of first attribute information that is used in a first application and is used in a second application different from the first application, issuing, by an attribute information conversion device, verification request access information and issuance request access information linked to each other in response to reception of a request for conversion from the first attribute information into the second attribute information;
   performing, by an attribute information conversion device, upon acquisition of the first attribute information of the user from a terminal through the verification request access information, conversion of the acquired first attribute information into the second attribute information; and
   outputting, by an attribute information conversion device, the second attribute information to the terminal through the issuance request access information.

* * * * *